United States Patent
Einhorn

[19]
[11] Patent Number: 6,128,426
[45] Date of Patent: Oct. 3, 2000

[54] HIGH SPEED BI-DIRECTIONAL OPTICAL ROTARY JOINT

[75] Inventor: Arthur J. Einhorn, Los Angeles, Calif.

[73] Assignee: Hughes Electronics Corporation, El Segundo, Calif.

[21] Appl. No.: 09/061,461

[22] Filed: Apr. 16, 1998

[51] Int. Cl.[7] ........................... G02B 6/36
[52] U.S. Cl. ........................... 385/25; 385/26
[58] Field of Search ........................... 385/25, 26

[56] References Cited

U.S. PATENT DOCUMENTS

| | | | |
|---|---|---|---|
| 4,698,937 | 10/1987 | Kornbrekke et al. | 250/221 X |
| 4,753,506 | 6/1988 | Einhorn et al. | 385/26 |
| 5,173,958 | 12/1992 | Folsom et al. | 385/25 X |
| 5,420,946 | 5/1995 | Tsai | 385/26 X |
| 5,463,704 | 10/1995 | Ziebol | 385/25 X |
| 5,541,406 | 7/1996 | Waynik et al. | 250/231.18 X |

OTHER PUBLICATIONS

BEI Industrial Encoder Division, E25 Optical Encoder, (http://beiied.com/) Jun. 25, 1997 (all pages).

The Accue–Coder Web Site–Shaft Encoders, Optical, Optical Shaft, Accu–Coder, (http://www.encoderprod.com/) ,Jun. 25, 1997 (all Pages).

U.S. Digital Corporation S1/S2 Optical Shaft Encoders, HEDS Optical/Encoder Module, E1 Quick Assembly Optical Encoder, Glossary of Terms, (http//www.usdigital.com), Jun. 25, 1997 (all pages).

*Primary Examiner*—John D. Lee
*Assistant Examiner*—Michael J. Stahl
*Attorney, Agent, or Firm*—Georgann S. Grunebach; M. W. Sales

[57] ABSTRACT

An improved optical rotary joint is achieved by transmitting information in the form of an optical signal from a part of the de-spun portion outside the rotational axis to the spun portion, or vice versa, thereby creating a continuous communication path 360° about the rotational axis. The optical rotary joint includes either a plurality of transmitters on one portion and a detector on the other portion, or a transmitter on one portion and a plurality of detectors on the other portion. In the former, the transmitters are controlled such that only the transmitters transmitting optical signals that will be detected by the detector at a given point in the rotation are activated and the remaining transmitters are deactivated. In the latter, the detectors are controlled such that only the detectors detecting the optical signal transmitter by the transmitter at a given point in the rotation are activated and the remaining detectors are deactivated.

16 Claims, 5 Drawing Sheets

HIGH SPEED BI-DIRECTIONAL OPTICAL ROTARY JOINT

This invention was made with U.S. Government support. The U.S. Government has certain rights in this invention.

BACKGROUND OF THE INVENTION

1. Field of the Invention

The present invention relates generally to the field of optical communication and, more specifically, to an improved optical rotary communication system that provides optical communication offset from the rotary axis on applications such as spacecrafts and gimbals.

2. Description of the Related Art

In recent years, the use of optical communication systems, such as fiber optic signal transmission systems, has increased. One problem confronted over the years has been the effective transmission of optical signals onto or off of rotating devices in what has been referred to as optical rotary joints. This problem exists for example in the context of spacecrafts, gimbals, or missile heads where one portion rotates relative to the other portion. In those situations, like others, the design of communication apparatus commonly includes a rotating device that lies co-axial with a non-rotating device and an axial portion intermediate the rotating and non-rotating devices.

One solution to the problem is to provide an optical rotary joint that transmits an optical signal between the interfacing surfaces of rotating and non-rotating members outside of the rotating axis to thereby allow the axial portion between the two members to remain free for other purposes. One example of this type of optical rotary joint is shown in Einhorn et al., Off Axis Optical Communication System, U.S. Pat. No. 4,753,506, which is hereby expressly incorporated by reference herein. An optical rotary joint includes first and second communication surfaces on spun and de-spun portions, respectively. A transmitter mechanism on one of the communication surfaces creates a plurality of communication paths which transmit an optical signal to the other communication surface. The communication paths form overlapping elliptical areas on the second communication surface to form a continuous ring for reception of the optical signal by a detector placed on the second communication surface. Alternatively, a single transmitter on the first communication surface transmits the optical signal through a single communication path and creates a single elliptical area on the second communication surface. The second communication surface has a plurality of space detectors mounted thereon which are spaced apart by a distance slightly less that the major axis of the elliptical area. In this arrangement, at least one of the spaced detectors lies within the elliptical area, thereby allowing constant transmission of the optical signal across the optical rotary joint.

The plurality of transmitters and the plurality of detectors shown in the Einhorn et al. patent are each activated at all times to facilitate communication of the optical signal across the optical rotary joint at all points in the rotation of the spun portion. In the embodiment utilizing a plurality of transmitters, the corresponding detector is encompassed by at most two elliptical areas projected onto the second communication surface at any point in the rotation. The remaining transmitters are generating communication paths which go undetected until the detector enters the projected elliptical area. Similarly, in the multiple detector embodiment, at most two detectors are encompassed by the single area projected by the lone transmitter at any point in the rotation. The remaining detectors are activated, but have no optical signal to detect until they enter the elliptical area.

Accordingly, there is a need for an improved optical rotary joint which reduces the power consumption of the optical rotary joint.

SUMMARY OF THE INVENTION

The present invention is directed to an improved optical rotary joint which reduces power consumption by deactivating components which do not form part of a communication link between a pair of relatively movable members. The optical rotary joint is formed between a relatively movable member positioned on a rotational axis and co-axial with a relatively stationary member, with both the movable and stationary members having a communication surface for interfacing with each other. The central axial portion is located intermediate the two members.

The optical rotary joint includes a means for transmitting information in an optical signal from a part of a first communication surface positioned outside the central axial portion. The central axial portion has a rotational axis, and the optical signal is directed through at least one communication path having an optical axis generally parallel to the rotational axis of the central axial portion, and then on to a part of a second communication surface also positioned outside the central axial portion to thereby create a communication area on a part of the second communication surface. The rotary joint further includes a means on the second communication surface for detecting the optical signal within the communication area. The detecting means includes at least one detection area of a size less than that of the communication area. At least one communication area projects on to at least one detection area at all points in the rotation of the movable member, and a communication path with a communication area intersecting a detection area creates a communication link. The optical rotary joint also includes a means for determining a relative angular position of one of the members with respect to the other member and for actuating either the transmitting means or the detecting means, whereby at least one communication link exists at all points in the rotation of the movable member. The determining and actuating means deactivates the transmitting means and detecting means that do not form part of the communication link at a given point in the rotation.

In an alternative embodiment of the optical rotary joint according to the present invention, the transmitting means has one communication path creating one communication area and the detecting means has a plurality of detection areas spaced about the second communication surface such that the communication path intersects at least one detection area at all points in the rotation of the movable member. In this embodiment, the determining and actuating means is adapted to cause the detecting means to enable each detection area to detect optical signals in the communication path only when the detection area intersects the communication area.

In another embodiment of the present invention, the detecting means has one detection area and the transmitting means has a plurality of communication paths, each creating a communication area. The communication paths and communication areas are spaced about the second communication surface such that the detection area intersects at least one communication area at all points in the rotation of the movable member. In this embodiment, the determining and actuating means is adapted to cause the transmitting means to enable each communication path only when the corresponding communication area intersects the detection area.

In another aspect of the present invention, a method of transmitting information in the form of an optical signal across a rotary joint having a relatively movable member positioned on a rotational axis and co-axial with a relatively stationary member. The movable member has a first communication surface interfacing with a second communication surface on the stationary member. A central axial portion having a rotational axis is located intermediate the two members. The method includes the step of transmitting information in an optical signal from a part of the first communication surface positioned outside the central axial portion through at least one communication path having an optical axis generally parallel to the rotational axis of the central axial portion. The optical signal is transmitted on to a part of second communication surface also positioned outside the central axial portion to thereby create a communication area on a part of the second communication surface. The method further includes the step of detecting the optical signal within the communication path on the second communication surface in at least one detection area of a size less than that of a communication area. At least one communication area projects onto at least one detection area at all points in the rotation of the movable member, and a communication path with a communication area intersecting a detection area creates a communication link. The method further includes the step of actuating either the communication paths or the detection areas based on the relative angular position of one of the members with respect to the other member to thereby cause at least one communication link to exist at all points in the rotation of the movable member.

In one alternative embodiment of the method according to the present invention, information is transmitted in an optical signal through one communication path creating one communication area, and the signal is detected in at least one of a plurality of detecting areas spaced about the second communication surface such that the communication area intersects at least one detection area at all points in the rotation of the movable member. In this embodiment, only the detection areas intersected by the communication area are actuated. In another alternative embodiment of the method according to the present invention, the optical signal is detected in one detecting area and information is transmitted in the optical signal through a plurality of communication paths, each creating one communication area. The communication paths and communication areas are spaced about the second communication surface such that the detecting area intersects at least one communication area at all points in the rotation of the movable member. Only the communication areas intersected by the detection area are actuated.

The features and advantages of the invention will be apparent to those of ordinary skill in the art in view of the detailed description of the preferred embodiment, which is made with reference to the drawings, a brief description of which is provided below.

DESCRIPTION OF THE PREFERRED EMBODIMENTS

Figure 1:
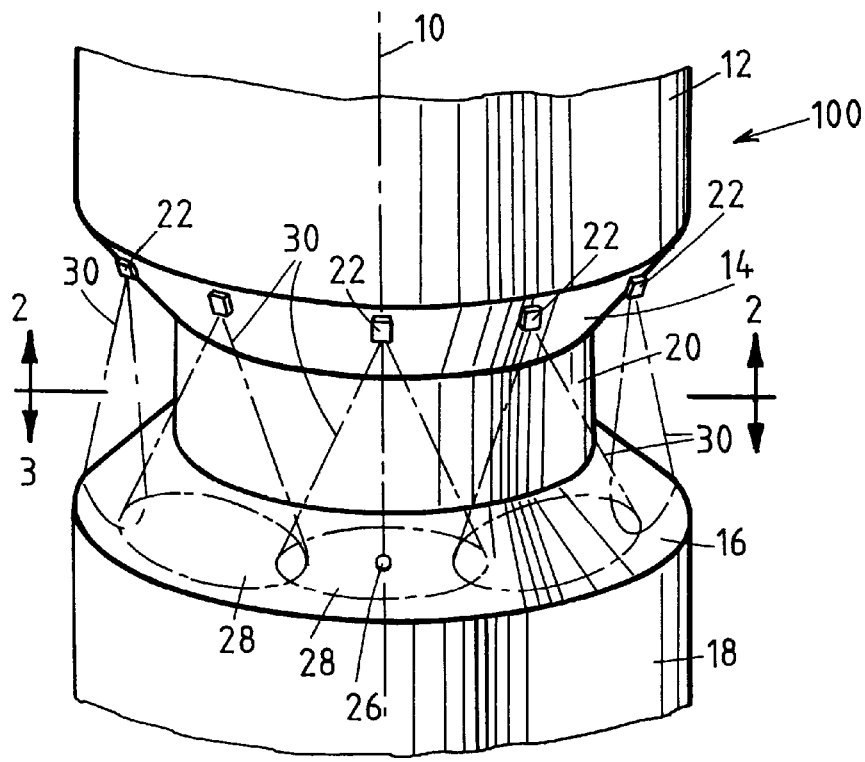
FIG. 1 shows a partial side perspective elevational view of an optical rotary joint having multiple transmitters and a single detector and capable of being utilized with the present invention.

One example of an optical rotary joint 100 embodying the apparatus and method of the present invention is illustrated in FIG. 1. An axial portion 20 of the optical rotary joint 100 is a cylindrical shaped element whose longitudinal axis is positioned on a rotational axis 10. A de-spun portion 12 of the spacecraft is also a cylindrical shaped element having a diameter of approximately ten to fourteen feet and positioned co-axial to the axial portion 20. The diameter of the de-spun portion 12 is greater than the diameter of the axial portion 20. One end of the de-spun portion 12 includes a conically shaped receiving area or second communication surface 14 fixed to one end of the axial portion 20. The second communication surface 14 extends from the entire circumferential edge of the end of the de-spun portion 12 obliquely towards the end of the axial portion 20 to which it is joined.

Similarly, a spun portion 18 is configured and dimensioned like the de-spun portion 12 and is positioned co-axial to the axial portion 20 on the end of the axial portion 20 opposite the de-spun portion 12. The spun portion 18 also includes a transmitting area or a first communication surface 16, similar to that of the second communication surface 14, and positioned so that such two surfaces interface each other at a distance of less than two feet. However, unlike the de-spun portion 12, the spun portion 18 rotates about the axial portion 20 on the rotational axis 10. Alternatively, the axial portion 20 can rotate along with spun portion 18.

Through apparatus not shown, analog or digital signals are sent to a plurality of transmitters 22 that are stationarily fixed on the exterior side of the second communication surface 14 between the edges thereof which are defined by the circumference of the de-spun portion 12 and the relatively smaller circumference of the axial portion 20. The transmitters 22 are either light-emitting diodes or semiconductor lasers, such as vertical cavity surface-emitting lasers (VCSELs), which are preferably light weight and require low power to operate. Other devices well-known in the art which produce an optical signal capable of carrying information are also contemplated. Any desirable frequency may be used for the input signal as long as it falls within the bandwidth capability of the transmitters 22.

Figure 2:
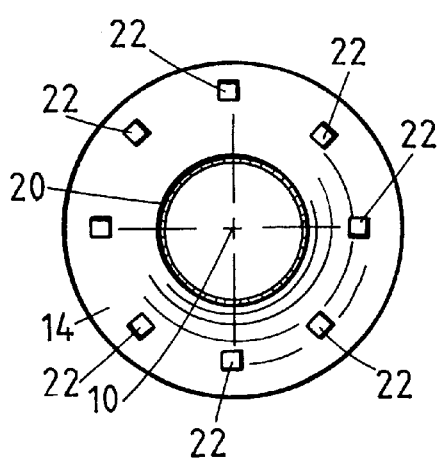
FIG. 2 is a reduced sectional view taken about line 2—2 of FIG. 1.

As shown in FIG. 2, the transmitters 22 are positioned on the second communication surface 14 equidistant radially from one another at a radial distance measured from the rotational axis 10. The transmitters are also equidistant circumferentially about a circumference measured by such radial distance. Each transmitter 22 creates a diverging beam in the form of a communication path 30 as shown in FIG. 1, through which the optical signal is transmitted to impinge the first communication surface 16. The apex of the communication path 30 is at the respective transmitter 22, and an elliptical area 28 is defined at the end of the communication path 30 opposite the transmitter 22. In the preferred embodiment, eight transmitters 22 create eight elliptical areas. However, more or less than eight transmitters 22 are contemplated by the inventors.

Figure 3:
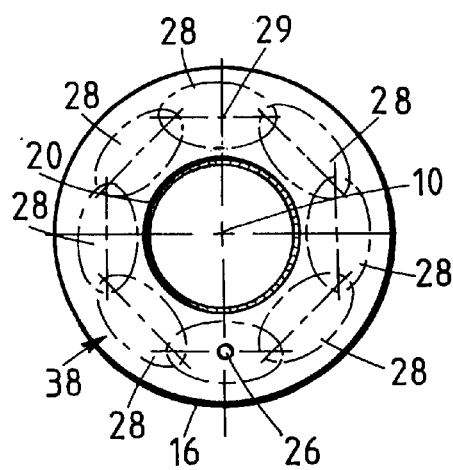
FIG. 3 is a reduced sectional view taken about line 3—3 of FIG. 1.

Referring to FIG. 3, each elliptical area 28 of each communication path 30 includes a major axis 29 which extends between the two ends of the elliptical area 28 having a distance greater than between any other two ends thereof. Each major axis 29 is of a length approximately equal to one another and approximately equal to that distance which separates each transmitter 22 circumferentially. Each major axis 29 lies tangential to the circumference of an imaginary circle whose radius is approximately equal to the radial distance of the transmitters 22 from the rotational axis 10 whereby the ends of each major axis 29 intersect at oblique angles with the ends of the immediately adjacent major axes 29. Each elliptical area 28 thereby partially overlaps the immediately adjacent elliptical area 28 on either of its sides. The area of overlap of each elliptical area 28 results from the particular positioning of each transmitter 22. As the optical signal is transmitted through the eight communication paths 30 and impinges the first communication surface 16 in the defined overlapping elliptical areas 28, a detection path 38 is thereby created for a full 360° about the rotational axis 10 on a part of the first communication surface 16. The detection path 38 describes an area through which the energy from the optical signal is generally equally distributed except for the overlapped portions.

A single detector 26 is stationarily fixed to the first communication surface 16 within the detection path 38 and thereby moves 360° about the rotational axis 10 and through the detection path 38 generally along each major axis 29 as the spun portion 18 rotates. The detector 26 detects the optical signal in the communication paths 30 through a detection area of a size that is substantially smaller than any one elliptical area 28. The detector 26 can be any appropriate conventional device in the art that is capable of receiving the optical signal. When the detection area is encompassed by one of the elliptical areas 28, a communications link is formed by the detector 26 and the transmitter 22 and communication path 30 associated with the elliptical area 28. Information is transferred from the de-spun portion 12 to the spun portion 18 through the communication link.

Although the de-spun portion 12 and the spun portion 18 are preferably cylindrical shaped elements, the present invention contemplates that other configurations would be suitable. Likewise, although the second communication surface 14 and the first communication surface 16 are shown as conical surfaces disposed in an oblique fashion with respect to the axial portion 20, other configurations are contemplated by the present invention. For example, in an alternative arrangement, the transmitters 22 and the detector 26 are mounted directly to the sides of the cylindrical shaped de-spun portion 12 and spun portion 18, respectively.

In the optical rotary joint 100 of FIG. 1, the detector 26 is encompassed by at most two elliptical areas 28 at a given point in the rotation of the spun portion 18. The remaining transmitters 22 project elliptical areas 28 onto the first communication surface 16 that are not detected and, therefore, do not form part of the communication link between the de-spun portion 12 and the spun portion 18. The power consumption of the optical rotary joint 100 can be reduced by controlling the activation of the transmitters 22 so that each transmitter 22 is activated when the detector 26 is encompassed by the associated elliptical area 28, and deactivated when the detector 26 is not encompassed by the associated elliptical area 18.

Figure 4:
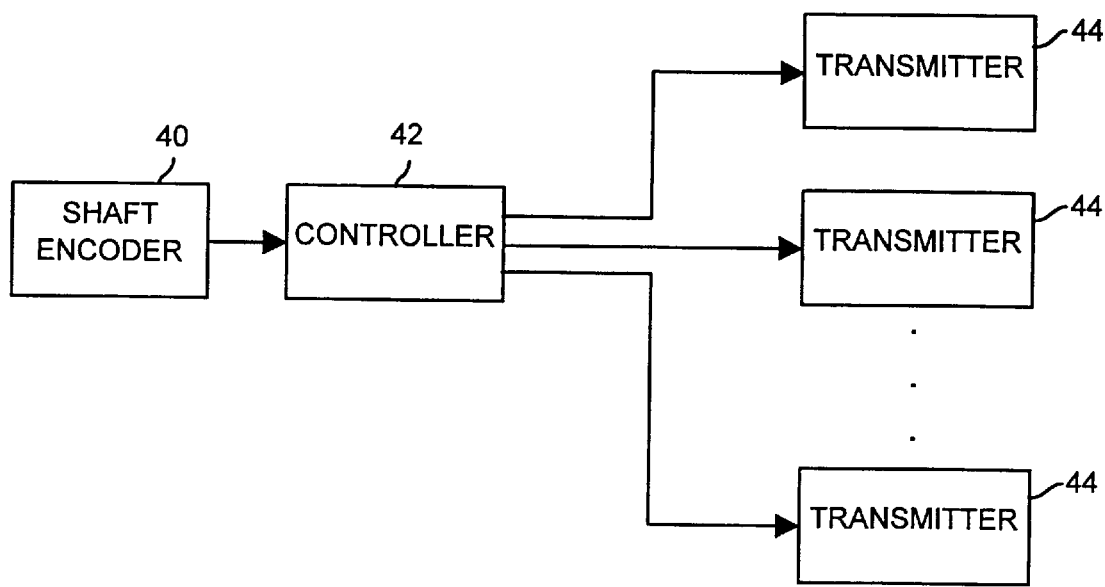
FIG. 4 is a block diagram of the apparatus and method of the present invention adapted for use with the optical rotary joint of FIG. 1.

The block diagram of FIG. 4 schematically illustrates the apparatus and method according to the present invention for controlling the activation of the transmitters in the optical rotary joint 100. The relative angular position of the spun and de-spun portions is detected by a shaft encoder 40. The shaft encoder 40 may be a hollow shaft encoder, such as that manufactured by BEI Industrial Encoder Division, model number HS35, or any other shaft encoder well-known in the art which produces a signal indicative of the angular rotation of a shaft or other rotating object. The shaft encoder 40 outputs a signal with information indicative of the relative angular position of the spun and de-spun portions to a controller 42 that is preprogrammed with the sequence of a plurality of transmitters 44. The controller 42 may be a standard microprocessor that is preprogrammed to interpret the information from the shaft encoder 40, and may include software driven circuitry, hardware driven logic circuits, or a combination of software and hardware, i.e. firmware. The controller 42 is preprogrammed to process the information from the shaft encoder 40 to determine which transmitters 44 are positioned so that a detector will detect a transmitted optical signal. The controller 42 electronically or electro-mechanically controls the transmitters 44 to either deactivate active transmitters 44 with signals that will not be detected by the detector, or to activate deactivated transmitters 44 with signals that will be detected by the detector. In this manner, the transmitters 44 are sequentially activated and deactivated as the optical rotary joint 100 rotates through 360°.

Figure 5:
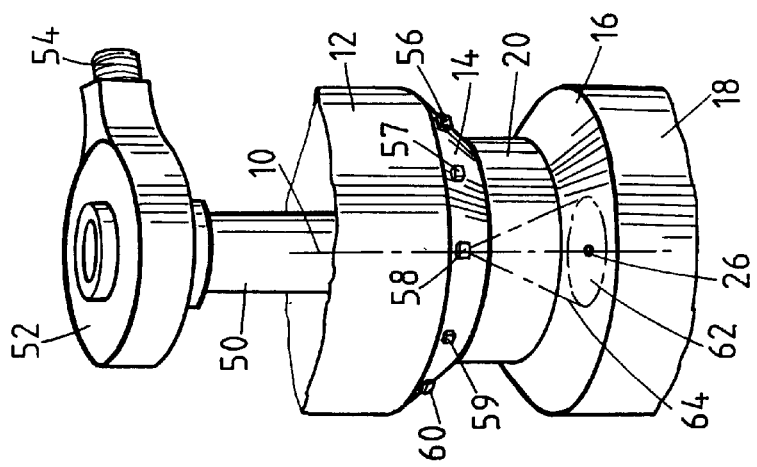
FIG. 5 is a partial side perspective elevational view of a first position of the optical rotary joint of FIG. 1, wherein the optical rotary joint incorporates the apparatus and method of the present invention.

FIG. 5 illustrates the optical rotary joint 100 of FIG. 1 adapted for use with the apparatus and method according to the present invention as shown and described in relation to FIG. 4. An axial portion extension 50 extends into the de-spun portion 12 and rotates along with the axial portion 20 and the spun portion 18. A shaft encoder 52 coupled to the extension 50 and is secured to structural members (not shown) to prevent movement of the shaft encoder 52 relative to the de-spun portion 12. As the axial portion extension 50 rotates with the spun portion 18, the shaft encoder 52 transmits a signal through a connector 54 which indicates the change in the angular position of the spun portion 18. This information is used by a controller and other associated circuitry (not shown) to determine the communication path or paths of a plurality of transmitters 56–60 that encompass the detector 26, and to activate the transmitters 56–60 with communication paths encompassing the detector 26 and to deactivate the remaining transmitters.

Figure 7:
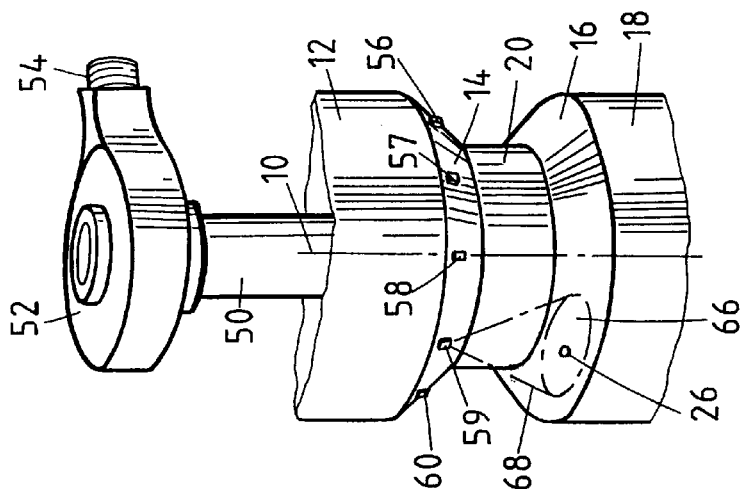
FIG. 7 is a partial side perspective elevational view of the optical rotary joint of FIG. 5 in a third position.
Figure 6:
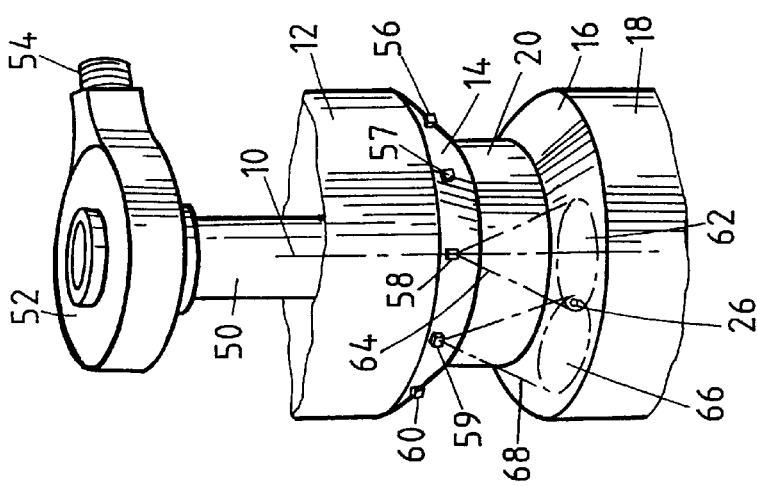
FIG. 6 is a partial side perspective elevational view of the optical rotary joint of FIG. 5 in a second position.

FIGS. 5–7 illustrate the activation and deactivation of the transmitters 56–60 as the detector 26 passes between adjoining elliptical areas. In FIG. 5, the detector 26 is encompassed by an elliptical area 62 created by transmitter 58. The transmitter 58 has been activated to create a communication path 64 through which the optical signal is transferred between the transmitter 58 and the detector 26. As the spun portion 18, the axial portion 20, and, consequently, the detector 26 rotate to the left as shown in FIG. 5, the detector 26 enters an elliptical area 66 created by the transmitter 59. The controller uses information of the rotation of the spun portion 18 provided by the shaft encoder 52 to determine that the detector 26 is entering the elliptical area 66. The controller causes the activation of the transmitter 59 to create a communication path 68 which can be detected by the detector 26. Because the elliptical area 66 overlaps the elliptical area 62, the transmitters 58, 59 can be activated at the same time to ensure that the communication link is maintained as the detector 26 passes from the elliptical area 62 to the elliptical area 66. As the spun portion 18, the axial portion 20, and the detector 26 continue to rotate to the left as shown in FIG. 6, the detector 26 exits the elliptical area 62 and, therefore, no longer detects the optical signal in the communication path 64. Based on the information provided by the shaft encoder 52, the controller deactivates the transmitter 58 until the detector 26 reenters the elliptical area 62. The transmitter 59 will remain activated until the transmitter 60 is activated as the detector 26 exits the elliptical area 66.

Figure 8:
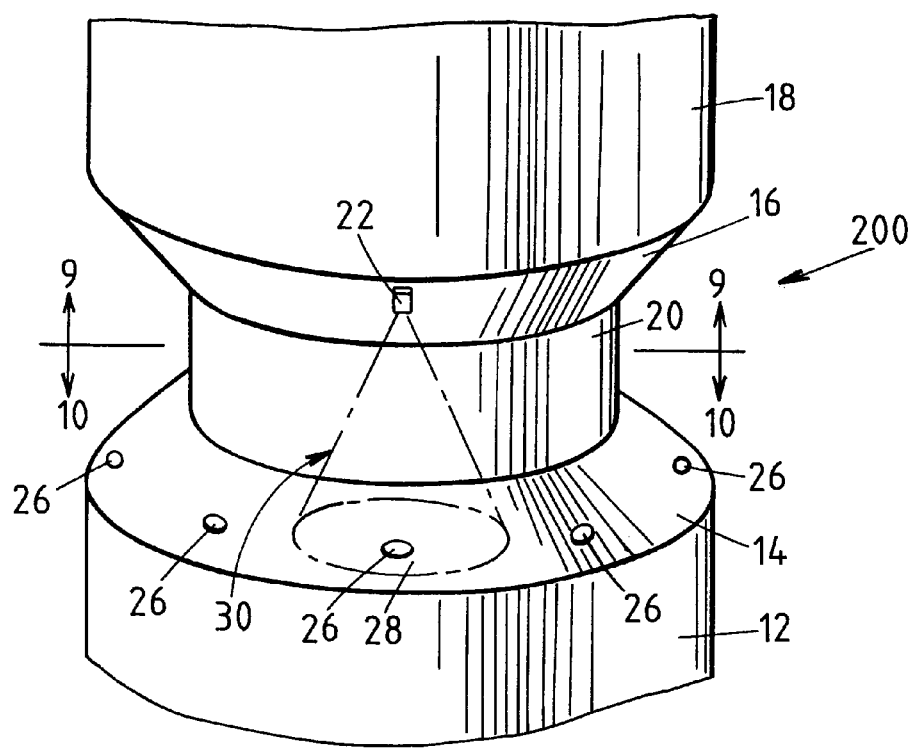
FIG. 8 is a partial side perspective elevational view of an optical rotary joint having a single transmitter and multiple detectors and capable of being utilized with the present invention.
Figure 9:
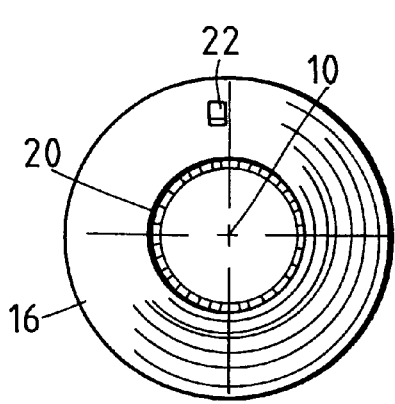
FIG. 9 is a reduced sectional view taken about line 9—9 of FIG. 8.
Figure 10:
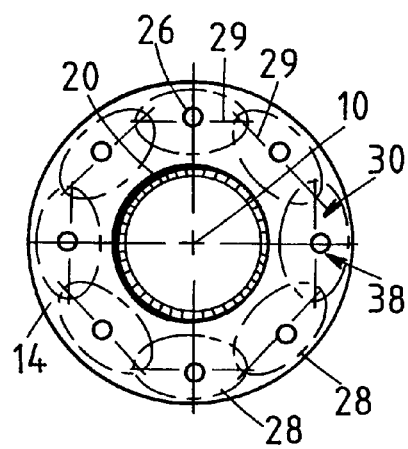
FIG. 10 is a reduced sectional view taken about line 10—10 of FIG. 8.

In a second preferred embodiment of an optical rotary joint 200 according to the present invention shown in FIGS. 8–10, the de-spun portion 12, second communication surface 14, spun portion 18, first communication surface 16, and axial portion 20 are provided as in the embodiment above with the optical rotary joint 100 rotated 180° for the purpose of illustration and clarity. A single transmitter 22 is stationarily fixed on the first communication surface 16. The transmitter 22 creates one communication path 30 having the elliptical area 28 at the second communication surface 14. The optical axis of the communication path 30 is generally parallel to the rotational axis 10. Similar to that in the first preferred embodiment, the continuous detection path 38 is thereby created about the rotational axis 10 on a part of the second communication surface 14, as shown in FIG. 10. The detection path 38 is generally defined by a rotation of the elliptical area 28 which will either be in direct communication with a detector 26 or will partially overlap two spaced detectors. Although only one communication path 30 is created in this preferred embodiment, the rotation of the spun portion 18 relative to the stationary elliptical area 28 creates the continuous detection path 38, similar to that in the first preferred embodiment as far as providing a continuous communication link.

As shown in FIG. 10, as compared to the single detector 26 in the first preferred embodiment, eight detectors 26 are stationarily fixed on the second communication surface 14 a common radial distance from the rotational axis 10 and equidistant circumferentially about a circumference defined by the radial distance. The radial distance is approximately equal to the radial distance from the rotational axis 10 to the transmitter 22. The circumferential distance by which each detector 26 is separated from one another is approximately equal to the length of each major axis 29, which is approximately equal to those in the first embodiment. The size of the detection area of each detector 26 is also like that in the first embodiment. As the spun portion 18 rotates, the elliptical area 28 of the transmitter 22 moves past the detectors 26. Consequently, at least one detector 26 will at all times be positioned in the elliptical area 28. A communication link is thereby formed by the transmitter 22, the communication path 30, and the encompassed detector 26. Continuous transmission and detection of the optical signal between the first communication surface 16 and the second communication surface 14 is thereby achieved. In an alternative arrangement, the transmitter 22 and the detectors 26 are mounted on the sides of the cylindrical shaped spun portion 18 and de-spun portion 12, respectively.

In the optical rotary joint 200 of FIG. 8, the elliptical area 28 encompasses at most two detectors 26 at a given point in the rotation of the spun portion 18. The remaining detectors 26 do not detect the optical signal in the communication path 30 and, therefore, do not form part of the communication link between the de-spun portion 12 and the spun portion 18. The power consumption of the optical rotary joint 200 can be reduced by controlling the activation of the detectors 26 so that each detector 26 is activated when the elliptical area 28 of the transmitter 22 encompasses the detector 26, and deactivated when the elliptical area 28 does not encompass the detector 26.

Figure 11:
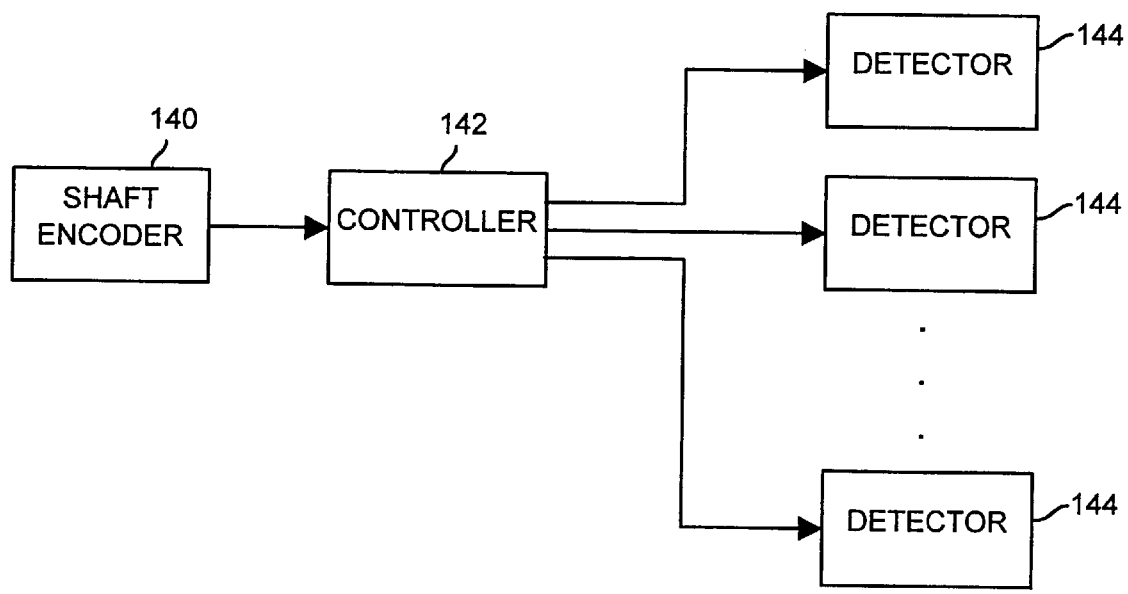
FIG. 11 is a block diagram of the apparatus and method of the present invention adapted for use with the optical rotary joint of FIG. 8.

The block diagram of FIG. 11 schematically illustrates the apparatus and method according to the present invention for controlling the activation of the detectors in the optical rotary joint 200. The relative angular position of the spun and de-spun portions is detected by a shaft encoder 140, similar to the shaft encoder 40 discussed in relation to FIG. 4. The shaft encoder 140 outputs a signal with information indicative of the relative angular position to a controller 142 that is preprogrammed with the sequence of a plurality of detectors 144. The controller 142 may be a standard microprocessor that is preprogrammed to interpret the information from the shaft encoder 140, and may include software driven circuitry, hardware driven logic circuits, or a combination of software and hardware, i.e. firmware. The controller 142 is preprogrammed to process the information from the shaft encoder 140 to determine which detectors 144 are positioned to detect a transmitted optical signal. The controller 142 electronically or electromechanically controls the detectors 144 to either deactivate active detectors 144 that are not positioned to detect the optical signal, or to activate deactivated detectors 144 that are positioned to detect the optical signal. In this manner, the detectors 144 are sequentially activated and deactivated as the optical rotary joint 200 rotates through 360°.

Figure 12:
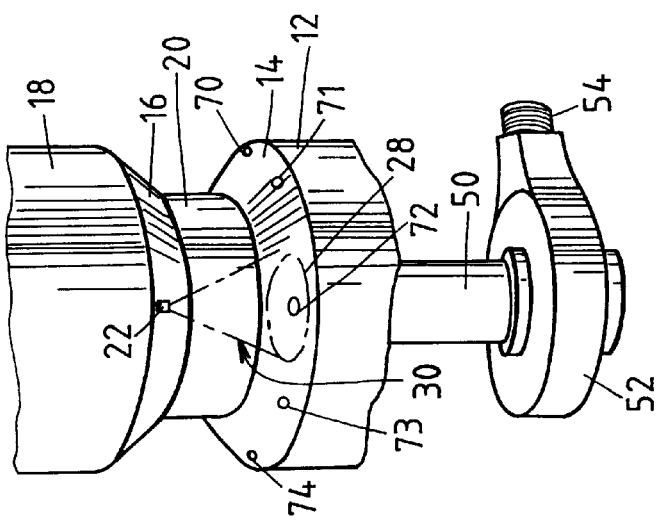
FIG. 12 shows a partial side perspective elevational view of a first position of the optical rotary joint of FIG. 8, wherein the optical rotary joint incorporates the apparatus and method of the present invention.

FIG. 12 illustrates the optical rotary joint 200 of FIG. 8 according to the apparatus and method of the present invention. An axial portion extension 50 extends into the de-spun portion 12 and rotates along with the axial portion 20 and the spun portion 18. A shaft encoder 52 is coupled to the extension 50 and is secured to structural members (not shown) to prevent movement of the shaft encoder 52 relative to the de-spun portion 12. As the axial portion extension 50 rotates with the spun portion 18, the shaft encoder 52 transmits a signal through a connector 54 which indicates the change in the angular position of the spun portion 18. This information is used by a controller and associated circuitry (not shown) to determine which of the detectors 70–74 is encompassed by the elliptical area 28 of the communication path 30, and to activate the detectors 70–74 encompassed by the elliptical area 28, and to deactivate the remaining detectors 70–74.

Figure 14:
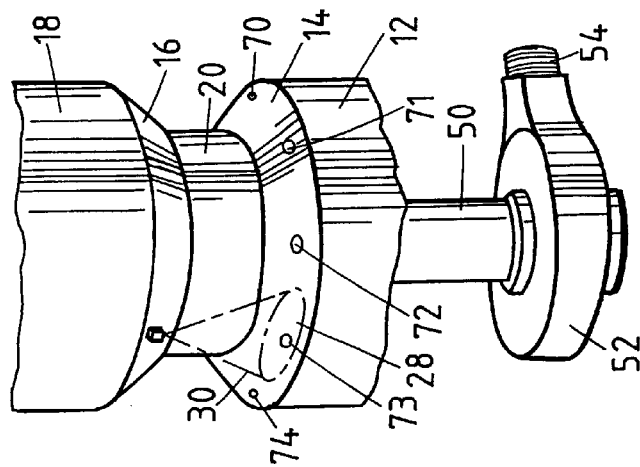
FIG. 14 is a partial side perspective elevational view of the optical rotary joint of FIG. 12 in a third position.
Figure 13:
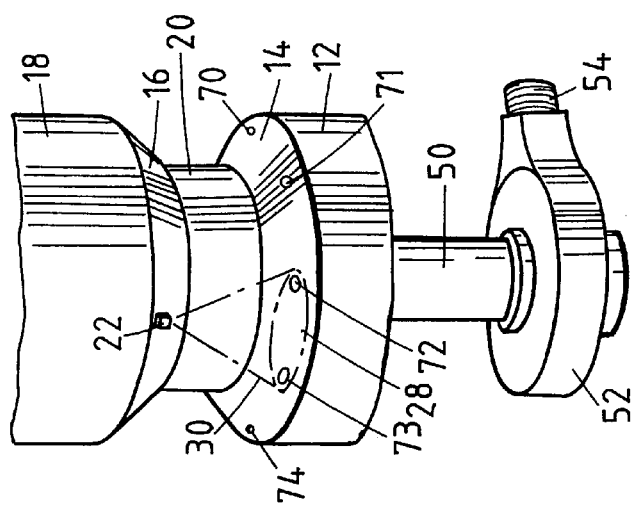
FIG. 13 is a partial side perspective elevational view of the optical rotary joint of FIG. 12 in a second position.

FIGS. 12–14 illustrate the activation and deactivation of the detectors 70–74 as the transmitter 22 passes between adjacent detectors 70–74. In FIG. 12, the elliptical area 28 encompasses the detector 72. The detector 72 has been activated to detect the communication path 30 through which the optical signal is transferred between the transmitter 22 and the detector 72. As the spun portion 18, the axial portion 20, and, consequently, the transmitter 22 rotate to the left as shown in FIG. 13, the elliptical area 28 created by the transmitter 22 encompasses the detector 73 adjacent the detector 72. The controller uses information of the rotation of the spun portion 18 provided by the shaft encoder 52 to determine that the elliptical area 28 now encompasses the detector 73. The controller causes the activation of the detector 73 to detect the optical signal in the communication path 30. Because both of the detectors 72, 73 are encompassed by the elliptical area 28, the detectors 72, 73 can be activated at the same time to ensure that the communication link is maintained as the elliptical area 28 passes from the detector 72 to the detector 73. As the spun portion 18, the axial portion 20, and the transmitter 22 continue to rotate to the left as shown in FIG. 14, the elliptical area 28 moves past the detector 72 and, therefore, the communication path 30 no longer projects the optical signal onto the detector 72. Based on the information provided by the shaft encoder 52, the controller deactivates the detector 72 until the elliptical area 28 again encompasses the detector 72. The detector 73 will remain activated until the elliptical area 28 moves past the detector 73.

It is also possible with the present invention to provide a filter or beam splitter so that a different wavelength will be transmitted at each optical path, thereby allowing for multiple channel communication systems, including bi-directional communication systems. Appropriate signal processing to coordinate the receipt of the respective wavelengths with the detectors would require appropriate electronic or optical filters before or after the detectors. The details of implementing a multiple channel communication system in the apparatus and method according to the present invention disclosed herein are within the capabilities of one having ordinary skill in the art.

As can be seen, the first preferred embodiment and the second preferred embodiment are essentially equivalent to each other in transmitting a continuous communication path. The eight transmitters 22 in the first preferred embodiment are the eight detectors 26 in the second preferred embodiment. The single detector 26 in the first preferred embodiment is the single transmitter 22 in the second preferred embodiment. In addition, the present invention contemplates that the transmission and reception elements in each embodiment can be included on both the first communication surface 14 and the second communication surface 16 so that transmission and reception can move in both directions between such surfaces, thereby facilitating bi-directional communications.

In yet another alternative embodiment of the present invention, activation of the detectors 26 of FIG. 8 is controlled by detecting the decrease in the light intensity as the detectors 26 approach the outer edge of the elliptical area 28. Because the communication path 30 has a conical shape, the light intensity at the edge of the elliptical area 28 is less than the intensity at the center of the elliptical area 28. In this embodiment, the detectors 26 are adapted to detect light intensity and to pass information of the detected light intensity to a controller (not shown) that is preprogrammed with a sequence for activating the detectors 26. This embodiment assumes that the spun portion 18 rotates in one direction only.

The controller uses the light intensity information to determine when a first detector 26 is approaching the edge of the elliptical area 28 and a second detector 26 is entering the elliptical area 28. As the light intensity measured by the first detector 26 decreases, the controller activates the second detector 26. The light intensity detected by the second detector 26 increases as it enters the elliptical area 28, thereby causing the controller to deactivate the first detector 26. The sequential activation and deactivation of the detectors 26 continues as the spun portion 18 rotates through 360°.

While the present invention has been described with reference to the specific examples, which are intended to be illustrative only and not to be limiting of the invention, it will be apparent to those of ordinary skill in the art that changes, additions and/or deletions may be made to the disclosed embodiment without departing from the spirit and scope of the invention.

What is claimed is:

1. An optical rotary joint having a relatively movable member positioned on a rotational axis and co-axial with a relatively stationary member, both the movable and stationary members having a communication surface for interfacing with each other, and a central axial portion intermediate the two members, the optical rotary joint comprising:

a transmitter adapted to transmit information in an optical signal from a part of a first communication surface positioned outside the central axial portion, the central axial portion having a rotational axis, the optical signal directed through at least one communication path having an optical axis generally parallel to the rotational axis of the central axial portion and then onto a part of a second communication surface also positioned outside the central axial portion to thereby create a communication area on a part of the second communication surface;

a detector on the second communication surface adapted to detect the optical signal within the communication area, the detector having at least one detection area of a size less than that of the communication area and whereby at least one communication area projects onto at least one detection area at all points in the rotation of the movable member and whereby a communication path with a communication area intersecting a detection area creates a communication link; and a controller adapted to determine a relative angular position of one of the members with respect to the other member and to actuate one of the transmitter and the detector whereby at least one communication link exists at all points in the rotation of the movable member.

2. The optical rotary joint of claim 1, wherein the transmitter has one communication path creating one communication area, the detector has a plurality of detection areas spaced about said second communication surface such that the communication path intersects at least one detection area at all points in the rotation of the movable member, and the controller is adapted to cause the detector to enable each detection area to detect optical signals in the communication path only when the detection area intersects the communication area.

3. The optical rotary joint of claim 2, further comprising an encoder adapted to produce an output signal indicative of the relative angular position of the movable member and the stationary member, wherein the controller is adapted to enable the detection areas intersected by the communication area and to disable the detection areas not intersected by the communication area based on the output signal.

4. The optical rotary joint of claim 3, wherein the encoder is a shaft encoder.

5. The optical rotary joint of claim 4, wherein the shaft encoder is a bi-directional shaft encoder.

6. The optical rotary joint of claim 1, wherein the detector has one detection area, the transmitter has a plurality of communication paths each creating a communication area with the communication paths and communication areas spaced about said second communication surface such that the detection area intersects at least one communication area at all points in the rotation of the movable member, and the controller is adapted to cause the transmitter to enable each communication path only when the corresponding communication area intersects the detection area.

7. The optical rotary joint of claim 6, further comprising an encoder adapted to produce an output signal indicative of the relative angular position of the movable member and the stationary member, wherein the controller is adapted to enable the communication paths with communication areas intersected by the detection area and to disable the communication paths with communication areas not intersected by the detection area based on the output signal.

8. The optical rotary joint of claim 7, wherein the encoder is a shaft encoder.

9. The optical rotary joint of claim 8, wherein the shaft encoder is a bi-directional shaft encoder.

10. The optical rotary joint of claim 1, wherein each communication surface has a transmitter and a detector to facilitate communications of optical signals in both directions across the rotary joint, and the controller is adapted to actuate one of the transmitters and the detectors in each direction whereby at least one communication link exists in each direction at all points in the rotation of the movable member.

11. The optical rotary joint of claim 1 wherein each communication area is elliptical.

12. A method of transmitting information in the form of optical signals across a rotary joint having a relatively movable member positioned on a rotational axis and co-axial with a relatively stationary member, the movable member having a first communication surface interfacing with a second communication surface on the stationary member, and a central axial portion co-axial with and intermediate the two members, the method comprising the steps of:

transmitting information in an optical signal from a part of the first communication surface positioned outside the central axial portion through at least one communication path having an optical axis generally parallel to the rotational axis of the central axial portion and then onto a part of the second communication surface also positioned outside the central axial portion to thereby create a communication area on a part of the second communication surface;

detecting the optical signal within the communication path on the second communication surface in at least one detection area of a size less than that of a communication area and whereby at least one communication area projects onto at least one detection area at all points in the rotation of the movable member and whereby a communication path with a communication area intersecting a detection area creates a communications link; and actuating one of the communication paths and the detection areas based on the relative angular position of one of the members with respect to the other member to thereby cause at least one communications link to exist at all points in the rotation of the movable member.

13. The method of claim 12, further comprising the steps of:

transmitting information in an optical signal through one communication path creating one communication area;

detecting the signal in at least one of a plurality of detecting areas spaced about the second communication surface such that the communication area intersects at least one detection area at all points in the rotation of the movable member; and actuating only the detection areas intersected by the communication area.

14. The method of claim 12, further comprising the steps of:

detecting the optical signal in one detecting area;

transmitting information in the optical signal through a plurality of communication paths each creating one communication area, the communication paths and communication areas spaced about the second communication surface such that the detecting area intersects at least one communication area at all points in the rotation of the movable member; and actuating only the communication areas intersected by the detection area.

15. The method of claim 12, wherein each communication surface has at least one communication path and at least one detection area to facilitate communications of optical signals in both directions across the rotary joint.

16. An optical rotary joint having a relatively movable member positioned on a rotational axis and co-axial with a relatively stationary member, both the movable and stationary members having a communication surface for interfacing with each other, and a central axial portion intermediate the two members, the optical rotary joint comprising:

a plurality of transmitters for transmitting information in an optical signal from a first communication surface positioned outside the central axial portion, the central axial portion having a rotational axis, each of the transmitters directing the optical signal through a communication path having an optical axis generally parallel to the rotational axis of the central axial portion and then onto a part of a second communication surface also positioned outside the central axial portion to thereby create a communication area on a part of the second communication surface, wherein the communication areas of adjacent transmitters overlap on the second communication surface;

a detector on the second communication surface for detecting the optical signal within the communication areas and having a detection area of a size less than that of the communication areas and whereby at least one communication area projects onto the detection area at all points in the rotation of the movable member and whereby a communication path with a communication area intersecting the detection area creates a communications link; and a controller adapted to determine a relative angular position of one of the members with respect to the other member and to actuate each of the transmitters having a communication area encompassing the detection area and deactivating each of the transmitters having a communication area which does not encompass the detection area whereby at least one communications link exists at all points in the rotation of the movable member.

* * * * *